US011762203B2

(12) United States Patent
Nicholson et al.

(10) Patent No.: US 11,762,203 B2
(45) Date of Patent: Sep. 19, 2023

(54) HEADSET FIT SYSTEM (71) Applicant: Lenovo (Singapore) Pte. Ltd., Singapore (SG)

(72) Inventors: John Weldon Nicholson, Cary, NC (US); Daryl Cromer, Cary, NC (US); Howard J. Locker, Cary, NC (US); Mengnan Wang, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 15 days.

(21) Appl. No.: 17/218,837

(22) Filed: Mar. 31, 2021

(65) Prior Publication Data

US 2022/0317445 A1 Oct. 6, 2022

(51) Int. Cl.
*G02B 27/01* (2006.01)

(52) U.S. Cl.
CPC ..... *G02B 27/0172* (2013.01); *G02B 27/0176* (2013.01); *G02B 2027/011* (2013.01); *G02B 2027/014* (2013.01); *G02B 2027/0187* (2013.01)

(58) Field of Classification Search
CPC .............. G09G 3/3406; G02B 27/0172; G02B 27/0176
USPC ...................... 345/8, 212; 382/107
See application file for complete search history.

(56) References Cited

U.S. PATENT DOCUMENTS

| | | | |
|---|---|---|---|
| 9,797,729 B1* | 10/2017 | Lee | G01C 21/165 |
| 2013/0293447 A1* | 11/2013 | Bickerstaff | G02B 27/0093 345/8 |
| 2017/0276943 A1* | 9/2017 | Osman | G06F 1/3234 |
| 2019/0101977 A1* | 4/2019 | Armstrong-Muntner | G06N 20/00 |
| 2020/0084546 A1* | 3/2020 | Mainini | H04R 1/1016 |
| 2021/0022678 A1* | 1/2021 | Langer | A61B 5/02416 |

* cited by examiner

*Primary Examiner* — Prabodh M Dharia
(74) *Attorney, Agent, or Firm* — Brian J. Pangrle (57) ABSTRACT

A headset can include a frame; a display assembly supported by the frame; a motion sensor that generates motion data responsive to motion of the frame; and circuitry that generates a frame fit signal via the motion data.

19 Claims, 10 Drawing Sheets

Time Initial (TI)  Time Final (TF)

HEADSET FIT SYSTEM

TECHNICAL FIELD

Subject matter disclosed herein generally relates to headsets such as head mounted display devices and systems.

BACKGROUND

A headset can include a display assembly and can be worn on a user's head.

SUMMARY

A headset can include a frame; a display assembly supported by the frame; a motion sensor that generates motion data responsive to motion of the frame; and circuitry that generates a frame fit signal via the motion data. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
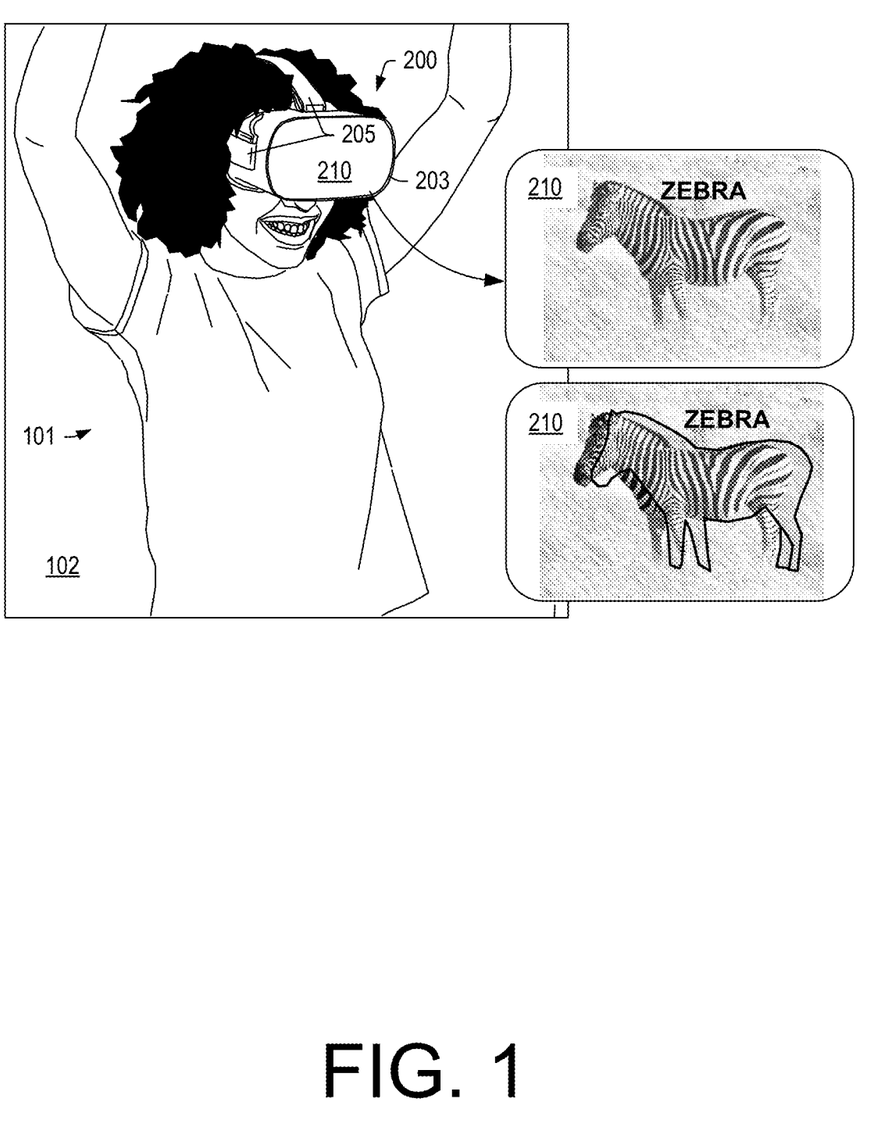
FIG. 1 is a diagram of an example scenario of a user and a headset.

FIG. 1 shows an example of a user 101 in an environment 102 wearing a head mounted display system, which may be referred to as a headset 200. As shown, the user 101 may be active and moving. Such movement may cause the headset 200 to move in an undesirable manner. In various instances, such movement can cause misalignment of renderings performed by the headset 200. For example, consider the user 101 viewing a zebra where the headset 200 aims to identify the zebra and highlight it in a view of the user 101. Where the headset 200 is properly fit to the user 101, the user 101 may see the zebra being highlighted with an outline, shading, color, etc.; whereas, when the headset 200 is not properly fit to the user 101, the user 101 may see a misalignment between the zebra and the rendering of the headset 200. Such a misalignment can diminish the experience of the user 101.

As an example, the headset 200 can include circuitry that can at least detect an improper fit of the headset 200. For example, consider circuitry that can detect that the headset 200 is too loose (e.g., a loose-fitting headset). As an example, the headset 200 may include one or more features that can adjust the headset 200 such that its fit is improved.

In various instances, headsets, such as those used for augmented reality (AR) and/or virtual reality (VR), can be loose fitting. When a headset is loose-fitting, renderings to a display or displays of the headset can be suboptimal in that they may be blurry, visuals may look wrong, or in the case of AR, one or more virtual objects that augment reality may not align with one or more physical objects (e.g., real world objects, things, etc.).

After some experience, a user may eventually understand what actions may be taken to adjust a headset to address suboptimal rendering, alignments, etc. For example, a user may adjust a headset to fit well, sometimes holding the headset in place manually, which can defeat the purpose of using a "hands-free" headset.

In various examples, a headset can include one or more motion sensors, which may be one or more inertia sensors and/or other types of sensors (e.g., position versus time, etc.). In such an example, circuitry of the headset can detect that the headset is loose by analysis of a motion profile. For example, circuitry may assess accelerometer readings, gyroscope readings, etc., of a loose-fitting headset where the readings show features that can distinguish a loose-fitted headset from a well-fitted headset.

Referring again to the user 101 of FIG. 1, various headsets are intended to function while a user is moving. For example, it can be a quite natural motion for a user to move her head, for example, to look at something that may be up, down, right, left, etc., which may result in a relatively rapid motion such as a quick change in head position of the user.

As shown in FIG. 1, the headset 200 can include a frame 203, head straps 205 coupled to the frame 203 and a display assembly 210 carried by the frame 203. The display assembly 210 may be of one or more types of configurations. For example, consider a see-through display, a projection display, etc.

Figure 2A:
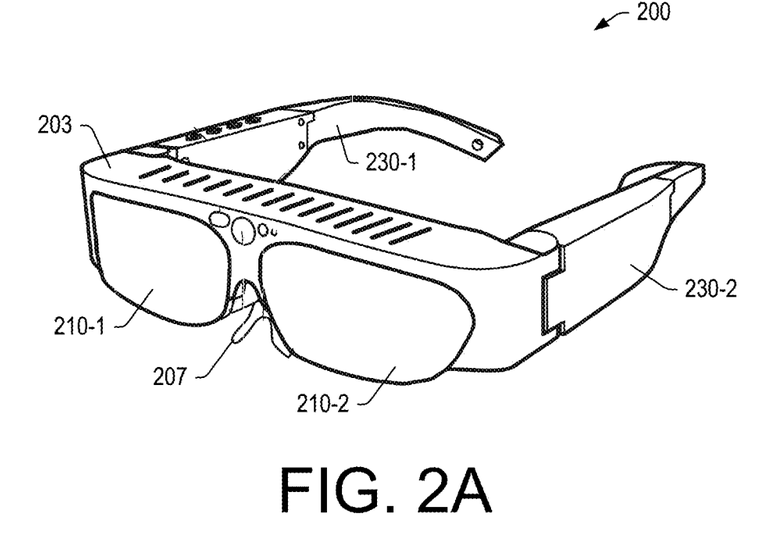
FIG. 2A and FIG. 2B are a series of diagrams of views of an example of a headset.
Figure 2B:
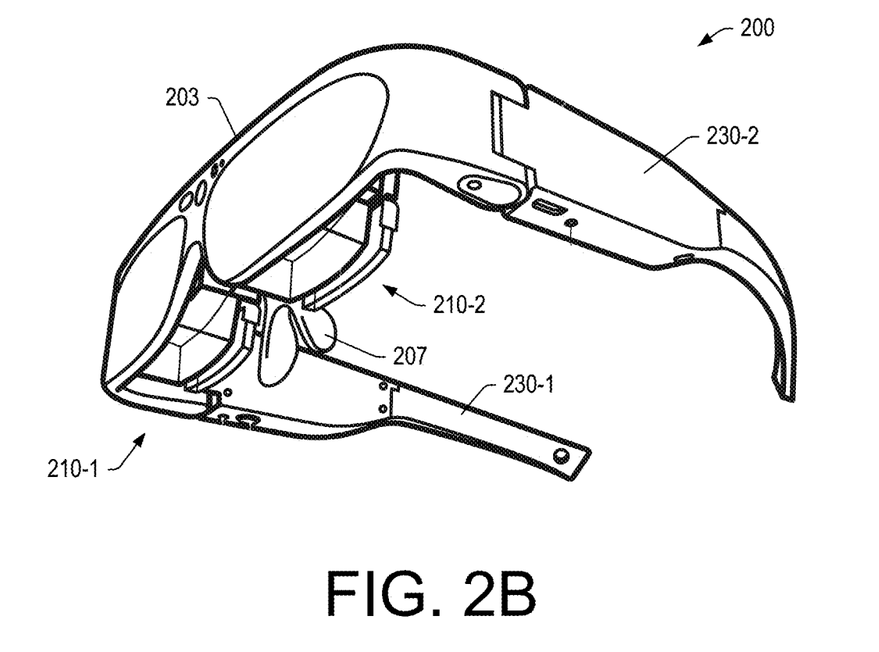

FIG. 2A and FIG. 2B show another example of the headset 200 as having temples 230-1 and 230-2 rather than the head straps 205. As shown in FIG. 2A and FIG. 2B, the display assembly includes two separate assemblies 210-1 and 210-2 that are carried by the frame 203 where a nose piece 207 can help support the headset 200 on a user's head along with the temples 230-1 and 230-2.

Figure 3A:
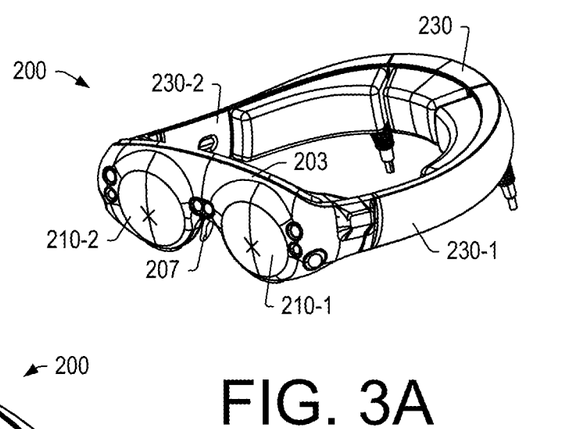
FIG. 3A, FIG. 3B and FIG. 3C are a series of diagrams of views of an example of a headset.
Figure 3B:
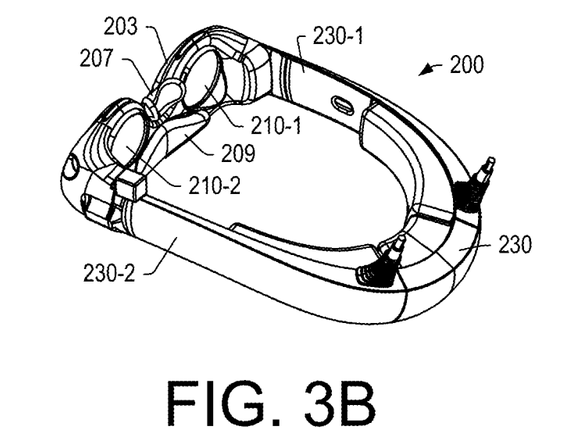
Figure 3C:
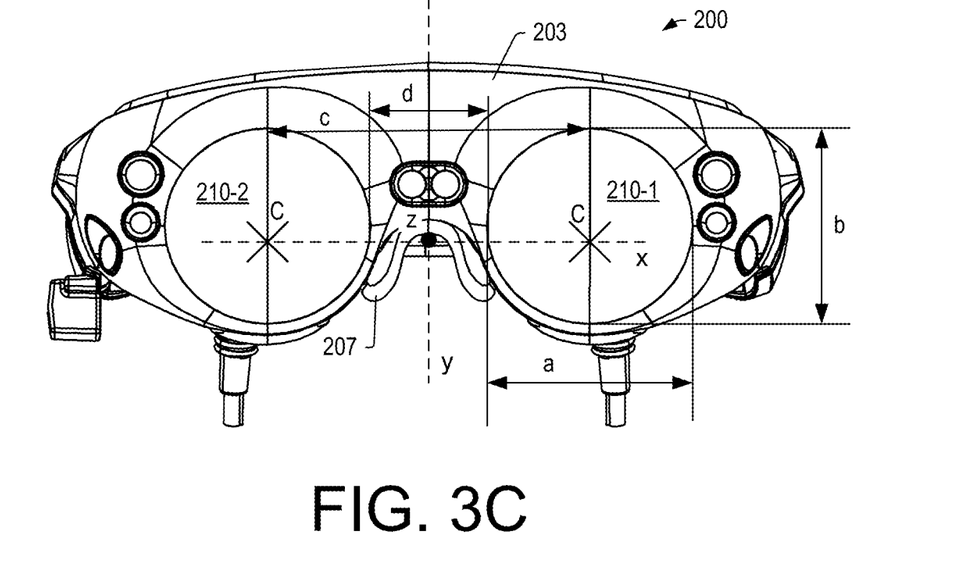

FIG. 3A, FIG. 3B and FIG. 3C show yet another example of the headset 200 as having a wraparound band formed by temples 230-1 and 230-2 and a joiner 230. As shown, the headset 200 can include one or more pads 209.

In the front view of FIG. 3C, the headset 200 is shown along with a Cartesian coordinate system with x, y and z axes. As shown, the Cartesian coordinate system can have an origin that is defined by a mid-point of the frame 203 and points on the display assemblies 210-1 and 210-2. As an example, circuitry may acquire and/or analyze motion sensor data using a coordinate system such as the coordinate system shown in FIG. 3C. In such an example, a x, y plane may be a plane for making, measuring and/or analyzing right and left movements and a y, z plane may be a plane for making, measuring and/or analyzing up and down movements.

The headset 200 can be defined using various measurements that may relate to measurements of facial features that relate to wearing of the headset 200. A wearer may aim to achieve a comfortable fit that is also a function fit such that the wearer has an acceptable AR and/or VR experience or other display viewing experience.

In the example of FIG. 3C, a so-called boxed lens (boxing) system may be utilized to describe various features, for example, as described in British Standard EN ISO 8624:2011+A1:2015(E), which uses rectangles that contain each lens shape to determine the dimensions of the front of the frame.

In the box system of measuring spectacle fronts, a parameter C is the box center, a parameter a is a horizontal lens size, a parameter b is a vertical lens size, a parameter c is a boxed center distance (BCD), and a parameter d is a distance between lenses (DBL). FIG. 3C shows locations demarcating the parameters C, a, b, c and d.

As an example, a line joining and extending beyond the centers of the rectangles (the box centers) can be referred to as the horizontal center line (HCL). In selecting a frame for a wearer, an eye vision specialist may align the frame HCL with the lower limbus (bottom of the iris)/lower eyelid and as such a line connecting the right and left lower limbus may be considered to be a facial version of HCL when measuring for a handmade frame in the traditional sense. In various instances, there can be exceptions, for example specifying a handmade half eye, making an extra deep frame, or when styling a classic round eye style where the pupil center is required to be on box center rather than 5 mm or 6 mm above HCL. In such instances, a facial HCL which is used to determine bridge measurements such as crest height will be different to the HCL that joins the box centers and becomes an individual feature of the design that can be translated into standard measurements for proper understanding.

As an example, the horizontal box size may be referred to as the eye size and the DBL as the bridge. Such measurements may be found printed on frames, usually in combination with the total side length. As an example, the box center distance (BCD) may be referred to as the frame PD. In the example of FIG. 3C: BCD, c=a/2+d+a/2=a+d where Frame PD=Eye Size+DBL.

For eyeglasses, the frame PD can be utilized such that a patient's actual PD is not to be greater than the frame PD, otherwise the eyes can be outset in the frame, which may look odd and restrict the patient's temporal field of view.

As an example, one or more parameters of the boxed lens (boxing) system and/or another system may be utilized in measuring fit, analyzing fit, adjusting fit, etc. For example, consider utilizing the HCL as a reference where looseness of fit may be referenced as being on a right side or a left side of the HCL (e.g., with respect to the origin of a coordinate system, etc.). As explained, fit can be associated with comfort and proper positioning for renderings to be seen by one or more eyes of a user.

FIG. 3C also shows the nosepiece 207 as coupled to the frame 203. As shown, the nosepiece 207 may be disposed between the display assemblies 210-1 and 210-2, for example, substantially within the distance of the parameter d.

As explained with respect to FIG. 1, FIG. 2A, FIG. 2B, FIG. 3A, FIG. 3B and FIG. 3C, various features can be associated with fit or improper fit. As explained, fit may be determined via the head straps 205, the nosepiece 207, the one or more pads 209, the temples 230-1 and 230-2, the joiner 230, etc. As explained above, various features of a headset can relate to wearability and wearer experience.

Figure 4:
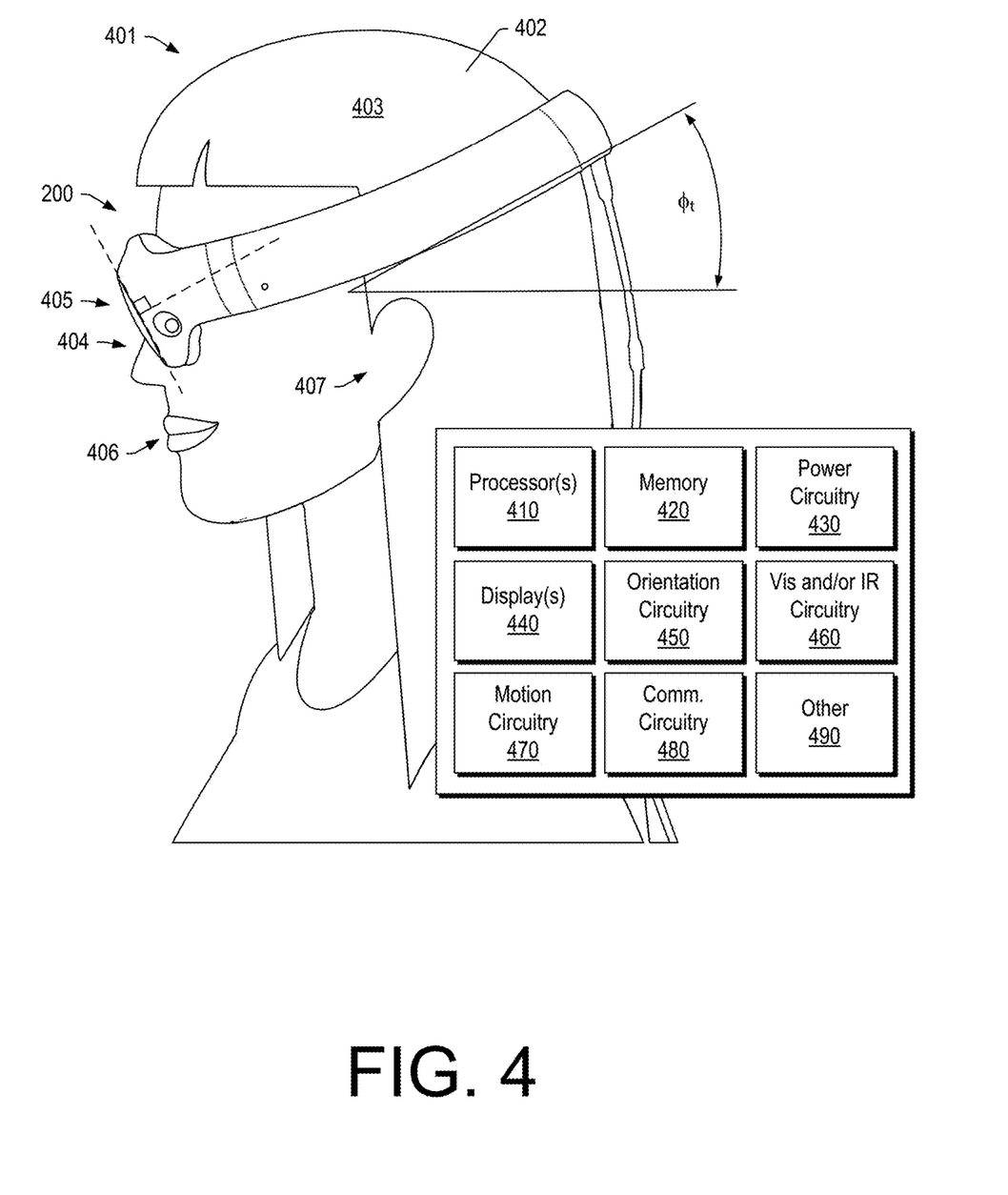
FIG. 4 is a diagram of a user and examples of features of a headset.

FIG. 4 shows an example of a wearer 401 (e.g., a user) that has hair 403 on her head 402, a nose 404, eyes 405, a mouth 406 and ears 407 (e.g., right and left ears) where the wearer 401 is wearing the headset 200. In the example of FIG. 4, the ears 407 may or may not be involved in fit; whereas, one or more pads, a nosepiece, temples, a joiner, a band, a strap or straps may be involved in fit, where one or more of such features may be adjustable.

In eyeglasses, an angle of side or side angle is defined in BS 3521: Part 2: 1991 as the vertical angle between a normal to the back plane of the front and the line of the side when opened. Another angle is the pantoscopic angle or pantoscopic tilt, which is related to the angle of side. Pantoscopic tilt is defined as a lens tilt about the horizontal axis, with respect to primary gaze of a subject. Simplistically, it can be explained as the rotation of lens bottom towards the cheeks. Pantoscopic tilt for eyeglasses may range, for example, from 0 degrees to 15 degrees where tilt of 3 degrees to 7 degrees may be considered normal.

In general eyeglass fitting, pantoscopic tilt can be taken to be the same for right and left (e.g., unless for example the bridge is twisted); whereas, it can be quite common for angles of side to be different if a patient has one ear higher than the other. For example, right and left temples can differ in angle of side to achieve a common pantoscopic tilt for right and left eyes. As an example, for eyeglasses, a pantoscopic tilt may be increased by increasing the right and left angles of side by the same amount. Compensation of the pantoscopic tilt to allow for optical center heights can often be undertaken; noting that, in many cases, an "as worn" pantoscopic tilt may be the best that can be achieved rather than one that allows the optimum performance of the lens, particularly if it is aspheric.

In FIG. 4, an angle $\phi_t$ is shown with respect to horizontal, which may approximate a pantoscopic tilt (e.g., pantoscopic angle or pantoscopic tilt angle). For example, consider a dashed line that is approximately normal to a plane of an eyepiece. As an example, a pantoscopic tilt for a headset can differ from that of eyeglasses with prescription lenses. Such a difference can be in range, which may be due in part to positioning of one or more displays in the headset.

In the example of FIG. 4, the headset 200 can include one or more of various types of circuitry, which can include one or more processors 410, memory 420 accessible to at least one of the one or more processors 410, power circuitry 430, one or more displays 440, orientation circuitry 450, visible and/or infrared (IR) circuitry 460 (e.g., as locating circuitry, etc.), motion circuitry 470, communication circuitry 480 and optionally one or more other types of circuitry 490.

As an example, the one or more displays 440 may include two OLED displays with a combined resolution in excess of 1000×600, with a suitable refresh rate in excess of approximately 30 Hz. As an example, the orientation circuitry 450 can include one or more types of circuitry that may reference external objects in an environment and may include one or more of an accelerometer, a gyroscope, and a magnetometer that may provide orientation data. As an example, the visible and/or IR circuitry 460 can include one or more IR emitters, one or more IR detectors, one or more visible wavelength detectors, etc. As an example, the motion circuitry 470 can include one or more types of circuitry such as, for example, one or more of an accelerometer, a gyroscope, and a magnetometer, which may provide motion data and/or orientation data (e.g., as part of the orientation circuitry 450, etc.). As an example, various types of circuitry may be integrated for one or more purposes, for example, consider orientation, visible and/or IR, and motion circuitry being integrated for one or more types of fit associated functionalities. As an example, the headset 200 can include audio circuitry that can include one or more speakers (e.g., earphone speakers) and/or one or more wireless transmitters (e.g., BLUETOOTH, etc.).

As an example, a headset can include circuitry such as a TOSHIBA TC358870XBG 4K HDMI to MIPI dual-DSI converter, a CYPRESS CYUSB3304 USB 3.0 hub controller, a ST MICROELECTRONICS STM32F072VB ARM CORTEX-MO 32-bit RISC core microcontroller, a WINBOND W25Q64FVIG 64 Mb serial flash memory, a NORDIC SEMICONDUCTOR nRF51822 BLUETOOTH smart and 2.4 GHz system on a chip (SoC), a CMEDIA CM119BN USB audio controller, a BOSCH SENSORTEC BMI055 6-axis inertial sensor, multiple TEXAS INSTRUMENTS TLC59401 16-channel LED driver with dot correction and grayscale PWM control, etc.

As an example, a headset can include one or more of a QUALCOMM SNAPDRAGON processor, SK HYNIX SRAM, a heat sink, a battery such as, for example, an 18650 battery format 2600 mAh battery, a microphone, an antenna, etc. As to the 18650 battery format, it can be approximately 65 mm (2.56 in) long or may be approximately 68 mm (2.68 in) long with an internal protection circuit (e.g., longer than an AA format battery).

As an example, a headset can include one or more features of the OCULUS GO headset. As an example, a headset can include a QUALCOMM SNAPDRAGON 821 SoC, 3 GB of LPDDR4 RAM, 32 GB or more of internal storage, an integrated ADRENO 530 GPU (e.g., approximately 500 GFLOPS of graphics performance), a 2600 mAh battery, non-positional three-degrees of freedom tracking, one or more proximity sensors, an accessory controller, a 5.5-inch LCD display with a 2560×1440 (1280×1440 pixels per eye) resolution in an RGB-stripe subpixel arrangement, a field of view of approximately 100 degrees (e.g., a horizontal pixel density of approximately 12.67 pixels per degree), and Fresnel lenses.

As an example, a headset can include one or more features of the MAGIC LEAP headset. For example, consider one or more of a NVIDIA TEGRA X2 SoC with two DENVER 2.0 64-bit cores and four ARM CORTEX A57 64-bit cores, an integrated Pascal-based GPU with 256 CUDA cores, 8 GB RAM, 128 GB onboard storage, BLUETOOTH 4.2, Wi-Fi 802.11ac/b/g/n, a USB-C connector, a 3.5 mm headphone jack, etc. The MAGIC LEAP headset utilizes waveguide display technology where a substantially transparent screen is illuminated from a side. In such an example, a waveguide (e.g., a photonic lightfield chip) guides light (e.g., imagery) across a thin layer of glass, magnifying it and angling it into a wearer's eye. As to focus planes, imagery can be in focus all of the time; however, some things can look crisp while others can look blurry, depending on where a wearer's eye is focused, where such an effect is achieved by stacking multiple waveguides to create focus planes, for example, slicing up an image into crisp and blurry areas. As explained, however, fit issues may give rise to misalignments and/or other vision issues for a wearer. The MAGIC LEAP headset includes an OMNIVISION OP02222 field-sequential color (FSC) LCOS device (e.g., customized variation of the OMNIVISION OP02220) that is an optical system for injecting images into the waveguides. The MAGIC LEAP headset includes a cast magnesium block that holds optics and sensors.

As to sizing, the MAGIC LEAP headset is available in two sizes, Size 1 and Size 2. The wearer's interpupillary distance (IPD) can be utilized to help select Size 1 or Size 2 where an IPD less than 65 mm corresponds to Size 1 and equal to or greater than 65 mm corresponds to Size 2. For the MAGIC LEAP headset, approximately 65 to 75 percent purchase Size 1, which is recommended if the headset is to be shared (e.g., multiple different wearers).

As explained above with respect to FIG. 3C, the box center distance (BCD) may be referred to as the frame PD, which may be an approximate interpupillary distance (IPD) (e.g., frame interpupillary distance, frame PD).

As to dimensions of a headset, consider, as an example, dimensions of approximately 190 mm×105 mm×115 mm (7.48 in ×4.13 in ×4.53 in) and, for example, a mass of approximately 468 g (1.032 lb) (e.g., OCULUS headset).

As an example, a headset may include one or more features of one of the MAD GAZE headsets such as, for example, consider one or more of the VADER headset, the ARES headset, the X5 headset, the X5S headset and the GLOW headset. The VADER headset includes dual lenses with a field of view of 45 degrees, an ANDROID OS, 3 GB of RAM, 32 GB of storage, an 8MP camera, Wi-Fi, GPS, GLONASS, accelerometers, gyroscopes, an ambient light sensor and the equivalent of a 1280×720 90-inch display within three meters of a user's face.

Some other examples of headsets include the MICROSOFT HOLOLENS headset, the META 2 headset, which works in conjunction with a PC or laptop, and the GOOGLE GLASS headset.

As an example, a motion sensor can be an inertia sensor. For example, consider the aforementioned BOSCH BMI055 inertia sensor, which can include an ultra-small, 6-axis inertial measurement unit (IMU) consisting of a digital, tri-axial 12-bit acceleration sensor and a triaxial 16-bit gyroscope, with resolutions of approximately 1 mg and approximately 0.004 degrees per second. Such a sensor can detect movements (translations, rotations, etc.) in 6 degrees of freedom (6 DoF). Inputs and/or outputs of such a motion sensor can include one or more of SPI, $I^2C$, etc. Supply voltage may be in a range of approximately 1.2 V to 3.6 V. As to size, the aforementioned BMI055 is approximately 3 mm×4.5 mm×0.95 mm. As an example, a sensor may include on-chip interrupt controllers that may provide for interactions with motion-based applications, with or without a microcontroller, etc.

As an example, a headset may include multiple motion sensors. For example, consider one positioned near a left side of a frame and one positioned near a right side of a frame. As an example, a motion sensor may be centrally positioned, for example, centered on a frame. As an example, a motion sensor may be positioned at a point that can be moved in a side to side plane and in an up and down plane (e.g., of head movements). As an example, a circuitry component may be an add-on that can be mounted to a headset such that it can acquire data as to motion that can be analyzed in an on-board manner and/or an off-loaded manner for assessment of fit of a headset. For example, consider a relatively small circuitry component that includes a motion sensor, memory and a battery that can be adhered to, clipped to, etc., a headset and utilized to acquire and/or store motion data (e.g., for particular movements, etc.) where such data may be analyzed to assess and/or improve fit of the headset.

As an example, a headset can be associated with a software development kit (SDK). As an example, a headset can include tracking sensor circuitry, which may include programmable instructions (e.g., firmware, software, etc.). As an example, a headset can include communication circuitry that can be operatively coupled to the Internet, for example, for augmented and/or virtual reality content to be downloaded and rendered.

Figure 5:
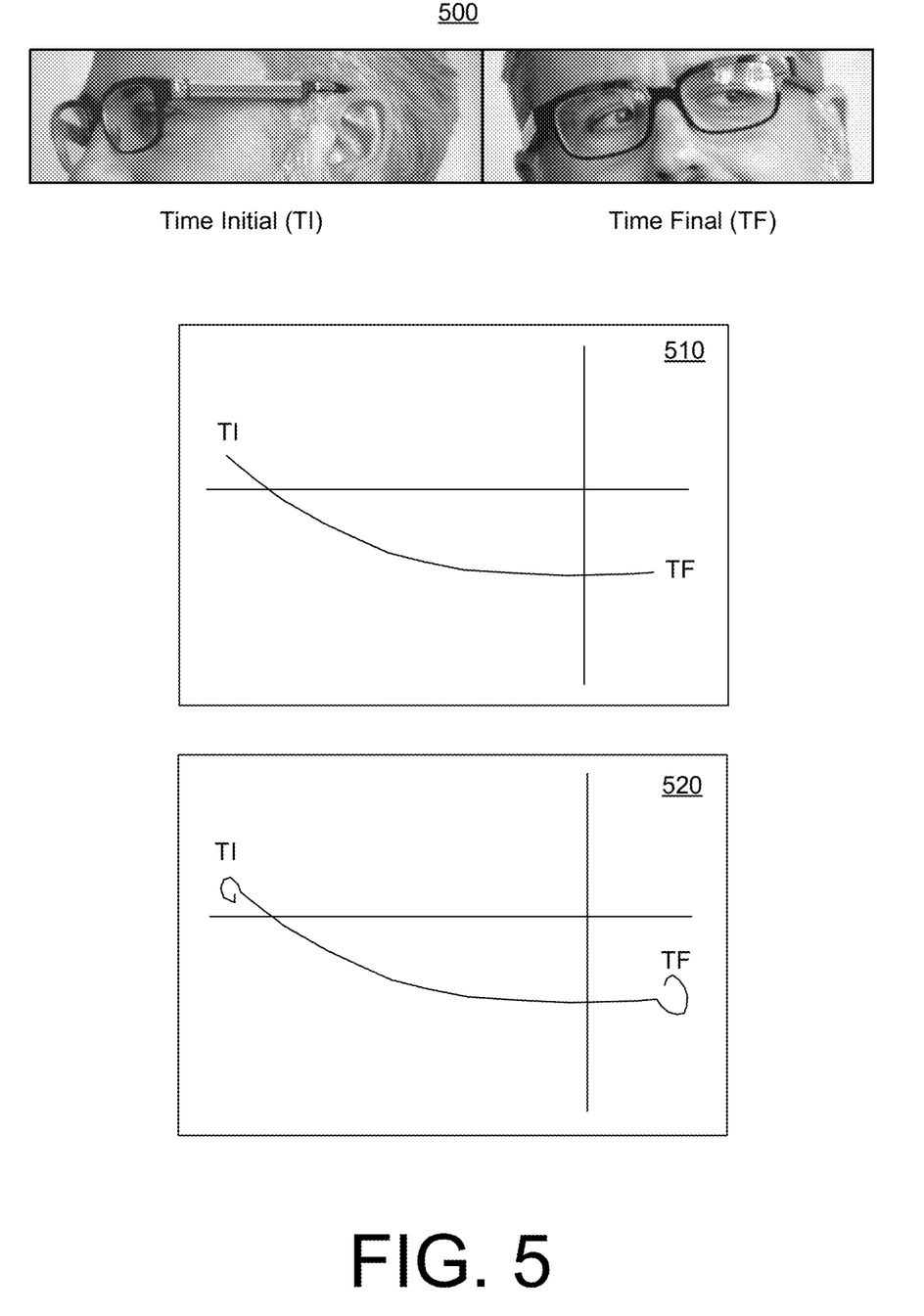
FIG. 5 is a series of graphics of an example of a user and examples of data plots.

FIG. 5 shows examples of photographs 500 from a video of a user wearing a headset where the user moves his head from a position at an initial time to a position at a final time where the movement may be approximated as a rotation of the user's head about an axis defined by the user's spine.

In anatomy, the atlas (C1) is the most superior (first) cervical vertebra of the spine and is located in the neck. It is named for Atlas of Greek mythology because, just as Atlas supported the globe, it supports the entire head. The atlas is the topmost vertebra and, with the axis (the vertebra directly below it), forms the joint connecting the skull and spine. The atlas and axis are specialized to allow a greater range of motion than normal vertebrae. They are responsible for the nodding and rotation movements of the head. The atlanto-occipital joint allows the head to nod up and down on the vertebral column. The dens acts as a pivot that allows the atlas and attached head to rotate on the axis, side to side. The atlas's chief peculiarity is that it has no body; it is ring-like and consists of an anterior and a posterior arch and two lateral masses.

In FIG. 5, a plot 510 illustrates an example of a well-fitting headset as a path or profile with respect to time and a plot 520 illustrates an example of an ill-fitting headset as a path or profile with respect to time (TI and TF with times inbetween). As shown, near the initial time and/or near the final time, one or more features can be detected that are associated with ill-fitting of a headset.

The plots 510 and 520 show position in two dimensions with respect to time, which may be referred to as motion profiles; noting that a motion profile may be in 1D where, for example, data may fold back on itself, etc. For a well-fitting headset of the plot 510, the motion does not exhibit the "bounciness" or "jiggling" as in the plot 520 of the ill-fitting headset. In particular, for a loose-fitting headset, there can be some initial delay caused by the headset remaining in place while the head is turning (e.g., a fit gap, etc.), then a quick jerky motion when the headset starts to move to "catch up" to the user. Additionally, when the user stops moving his head, the headset continues to move before reaching the other end of the slop in the fit, and jerks back toward a final position (e.g., a rebound).

Figure 6:
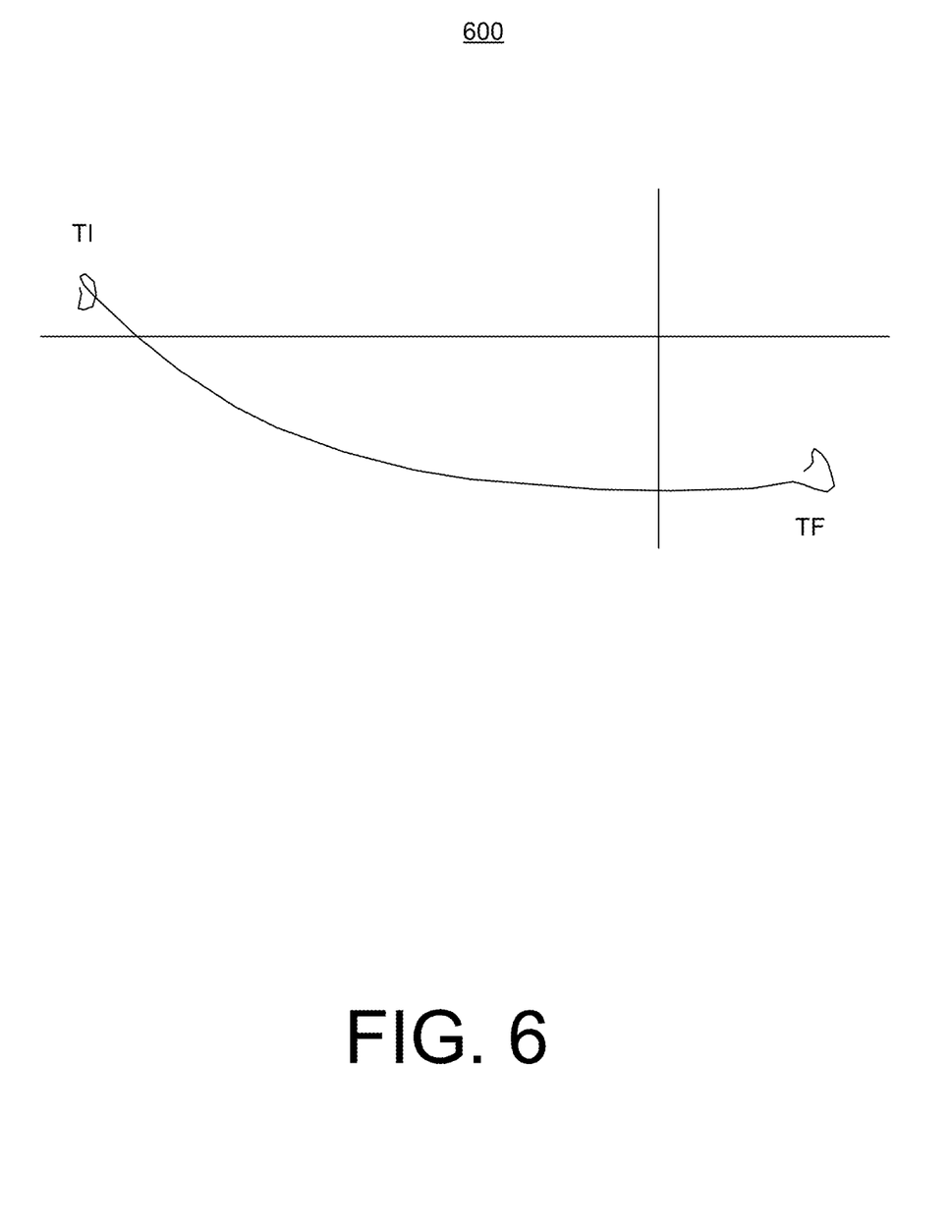
FIG. 6 is a diagram of an example of a data plot.

FIG. 6 shows an enlarged plot 600 of the loose-fitting motion as in the plot 520 of FIG. 5. As shown, features in a motion profile may distinguished and, for example, analyzed to determine whether fit is appropriate or not and, for example, what type or types of adjustments (e.g., manual and/or automatic) may be call for to improve fit.

As an example, existing motion sensing capabilities may be utilized and/or one or more MEMS types of motion sensors may be utilized, optionally with USB, WiFi, BLUETOOTH, etc., communication circuitry such that native capabilities of a headset may be utilized, for example, with one or more executable fit applications that can at least analyze motion sensor data.

As an example, one or more an application programming interfaces (APIs) may be utilized, for example, to access motion data, control operation of circuitry, etc. As an example, an SDK may be utilized for purposes of fit detection.

As explained, a headset can include circuitry that can be used to detect one or more kinds of artifacts indicating a loose-fitting headset. In such an example, the headset can include circuitry that can then prompt a user to adjust the fit, or if the headset supports it, to automatically adjust the fit.

For example, consider automatically adjustable head straps, temples, nosepiece, etc. As an example, a headset can include one or more electric motors (e.g., linear, rotary, etc.) that can adjust tension, length, position, etc. For example, consider adjustable temple ends that can move along a temple axis, rotate about a temple axis, etc. As another example, consider a head strap that can be adjusted as to length and/or resiliency (e.g., tension).

As explained, a headset can include one or more types of motion sensors (e.g., inertial sensors like an accelerometer, a gyroscope, computer-vision based tracking systems, timing-based infrared scanning, etc.).

As an example, a method can include combining (e.g., fusing) of accelerometer data with the pose estimation. In such an example, accelerometer data can show one or more loose-fitting indicative motion artifacts, and with minimal latency.

In addition to detecting a motion profile when it happens naturally, a headset may render visually and/or audibly a prompt for a user to move in a particular manner or manners (e.g., side to side, up to down, down to up, etc.). As an example, a headset may render a message to a display assembly that prompt a user to swing her head where the headset can analyze data for one or more types of motion artifacts indicative of a loose-fitting headset. As an example, an application may execute at the time of a user putting on a headset such that the user can have fit adjusted and/or checked prior to commencing a session (e.g., a game, training, etc.).

As an example, motion sensor data can be analyzed for an indication of a rebound or rebounds. A rebound can be indicated by a change in direction, which may be a positional direction. For example, a headset or a portion thereof may move in a direction, which may be straight, slightly curved, etc., which may correspond to movements generally of the head via the neck. Where movement direction changes, continues for a brief moment of time and then halts, that can be an indication of a rebound. As mentioned, position with respect to time data may be utilized, including, for example, first derivative with respect to time (e.g., velocity), second derivative with respect to time (e.g., acceleration), etc. As an example, one or more vectors may be utilized in one or more types of coordinate systems.

As an example, an analysis may include utilizing a 1D, a 2D and/or a 3D spatial coordinate system. As shown in FIG. 3C, FIG. 5 and FIG. 6, a multidimensional coordinate system may be utilized, which may be planar or define one or more planes where a plane may be fixed and/or dynamic. As an example, for some movements, a user may be prompted to maintain eyes substantially level and in a plane where the user's spine is substantially perpendicular to the plane while moving her head from side to side (e.g., from center to left, from left to center, from center to right, from right to center, from left to right and/or from right to left) and/or a user may be prompted to maintain her noses in a plane while moving her head up and down (e.g., from nose level to nose up, from nose up to nose level, from nose level to nose down, from nose down to nose level, from nose up to nose down and/or from nose down to nose up). As an example, a user may be prompted to move in a 3D manner with up/down and side to side mixed movements. As an example, a user may be prompted to move at a certain speed, with a certain acceleration, deceleration, etc. As an example, a marker may be rendered to a display that may move where a user is expected to follow the marker to thereby move his head in a determined manner.

As an example, a headset may store data such that templates may be generated for recall and use in detecting poor fit. As explained, various types of motions may be prompted where such types of motions may provide for detection of one or more root causes of fit (e.g., strap, nosepiece, left temple, right temple, etc.).

Figure 7:
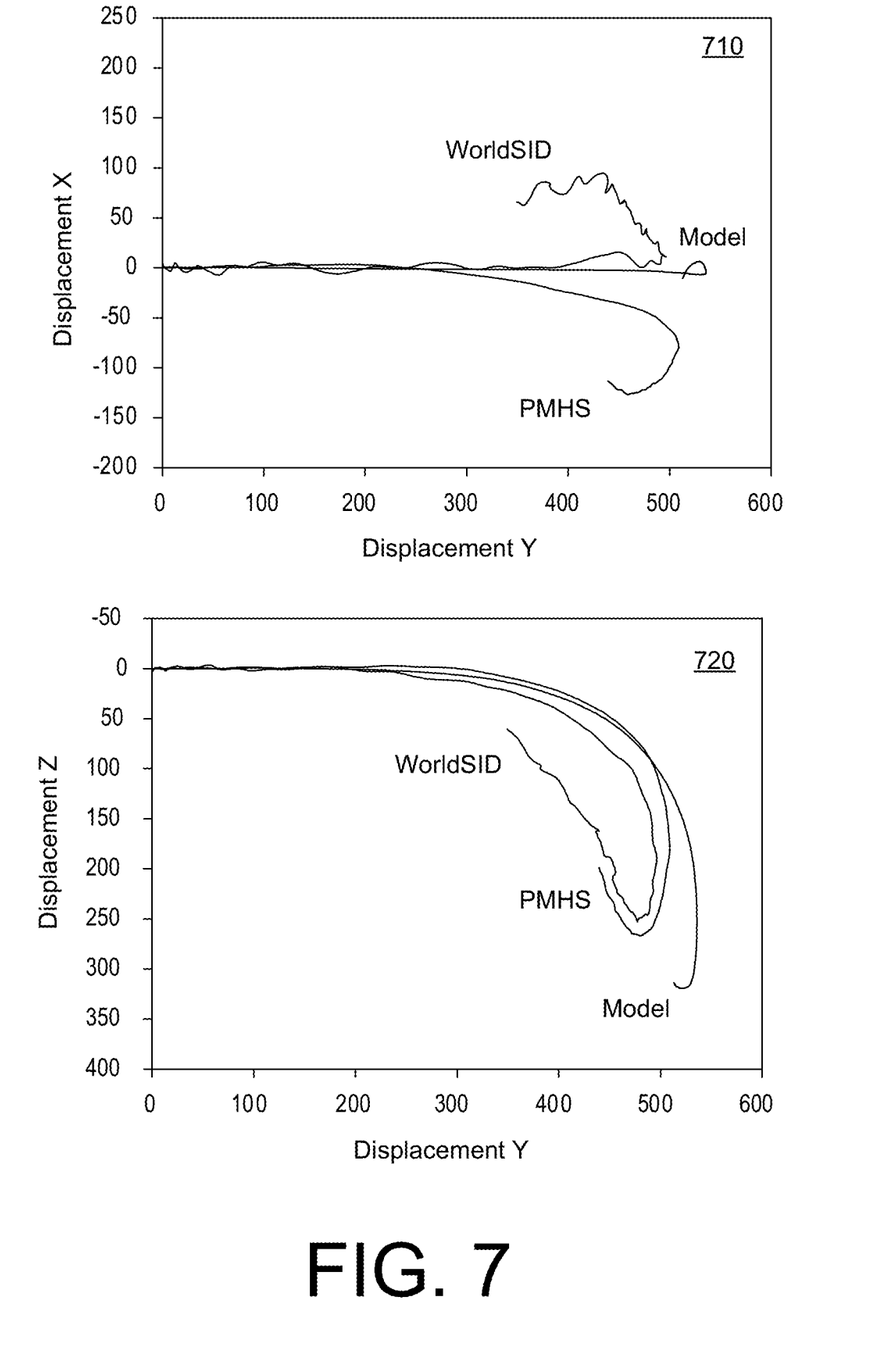
FIG. 7 is a series of diagrams of examples of data plots.

FIG. 7 shows examples of plots 710 and 720 from an article by Douglas et al. "Factors influencing occupant-to-seat belt interaction in far-side crashes." Annual proceedings. Association for the Advancement of Automotive Medicine vol. 51 (2007): 319-39, which is incorporated by reference herein. In particular, the plots 710 and 720 show head trajectories in a 90 degree far-side test with a forward D-ring and no pretension where the plot 710 is in a transverse plane 710 and where the plot 720 is in a coronal plane 720, both for times from 0 ms to 240 ms. The plots 710 and 720 show dynamic sled tests with PMHS and WorldSID along with a model.

In the test, the test subjects (PMHS, WorldSID and model) slipped out of the shoulder portion of the seat belt. The belt provided restraint via loading the thorax in the early phases of impact, however this was more prominent in the model. The belt subsequently slipped past the shoulder and got caught on the upper arm near the elbow. The resulting lateral (Y) head displacements for the test subjects were similar (within 5 percent). In contrast to the physical test results, the model spent in excess of 100 ms at 95 percent of maximum displacement, whereas the PMHS and WorldSID only spent 60 ms and 65 ms respectively. This was related to the human model continuing to slip and not rebound as quickly as the PMHS and WorldSID. This being partly related to the model's slightly lower lateral velocity compared to both PMHS and WorldSID.

As shown in the plots 520, 600, 710 and 720, rebound can be seen in position with respect to time data for a particular period of time. The "hook" or "loop" like shapes of the position with respect to time data over later times is evidence that the head of the seat belt wearer was "loose" and able to rebound (e.g., change direction). As an example, a hook or a loop may be analyzed using a model, which may be a geometric model, a time model, a mixed geometric and time model, etc. For example, consider a circle model, an ellipse model, a time deviation model (e.g., time from a deviation from a relatively smooth curve to a hook or a loop type of curve, etc.), etc. As an example, a hook or a loop may be fit using a circle to determine a radius or a diameter that can be assessed for looseness or, for example, an ellipse may be utilized where a minor axis and a major axis can be determined, optionally with an orientation. In the ellipse example, the minor and major axes and orientation may be analyzed for determining a cause (e.g., a location, etc.) of looseness. As explained, a user may be instructed to move spatially in time in 2D and/or 3D where one or more types of geometric and/or time models may be utilized. As an example, an ellipsoid model and/or another type of model may be utilized to assess data in three spatial dimensions. As an example, an equation with parameters may be utilized to analyze motion data (e.g., spatial fitting parameters using, for example, a least-squares or other technique).

As an example, consider an equation of an ellipse as follows:

$$\frac{x^2}{a^2} + \frac{y^2}{b^2} = 1$$

where a 2D x, y coordinate system is utilized along with parameters of half width and half height, $\alpha$ and b, respectively.

The foregoing equation can be centered at an origin, noting that a transform may be utilized to compare the origin to one or more other coordinate systems, positions, locations, etc. As explained, an ellipse can include a minor axis and a major axis, along with a center, vertexes, co-vertexes, foci, linear eccentricities, etc. An ellipse may be analyzed as being a shape that is formed by cutting a cone with a plane (e.g., an inclined plane). As an example, a portion of an ellipse or another geometric model may be utilized. For example, consider half of an ellipse. In the plots 510, 520, 600, 710 and 720, in these 2D views of the data, one or more of a circle, an ellipse and another type of geometric model may be utilized. In the examples of FIG. 5, FIG. 6 and FIG. 7, one or more half ellipses may be suitable for analyzing one or more features of a hook or loop.

As explained, Douglas et al. examined pretension of a seat belt where various pretensions were examined for their effect on 2D displacement plots. As an example, a headset may be of a particular tension. For example, a head strap can be of a particular tension, a temple or temples can be of particular tension or tensions, etc. For a headset, it is "belted" to the head (e.g., via a strap, straps, temples, etc.); whereas in a vehicle, a person is belted to a car seat. In the former, the headset moves with respect to the person's head; whereas, in the latter, the person moves with respect to the car seat. The data in Douglas et al. demonstrate that position of restraint, force (e.g., tension) or restraint, sled parameters, etc., can be detected in position data with respect to time where such data may be analyzed in one or more dimensions.

As an example, for a headset, a method can include analyzing rebound after maximum excursion, which can be an indicator of fit. Such a method may be performed where a user is prompted to move in a particular manner or manners, which may be related to diagnosis of a particular aspect or aspects of fit. For example, fit adjustments may be limited and prompted tests may aim to coordinate such fit adjustments to improve user experience for a headset. As an example, a headset can include circuitry that can instruct a user to move in one or more directions (e.g., with respect to gravity, head-spine, etc.), move with one or more speeds, move with one or more accelerations, etc. As an example, a headset may be aware of its mass and be able to determine one or more movement associated metrics (e.g., force, momentum, acceleration, etc.). As an example, a headset can include circuitry that can analyze motion data using one or more metrics, which may be able to determine how a user may adjust the headset or how the headset may adjust itself.

As explained, a graphical user interface (GUI) may be rendered to a display assembly that may guide a user in making one or more adjustments, one or more movements, etc. As an example, a GUI may include rendering information to a display assembly to assess alignment and/or misalignment. In such an example, user responses and/or eye tracking and/or other features of a headset may be taken into account in a fit adjustment process. For example, if a misalignment is noted, the headset may determine that it is likely caused by a right side looseness of fit and instruct a user to move to acquire data to assess the nature of the right side looseness of fit and/or automatically adjust fit and perform another alignment/misalignment assessment. In such an approach, a headset can include decision logic such as a decision tree that can utilized human and/or machine feedback to make decisions to help achieve acceptable fit.

As explained, one or more of slop (e.g., slack), tension, force, etc., may be analyzed to detect proper or improper fit of a headset and/or to recommend and/or automatically adjust a headset.

Figure 8:
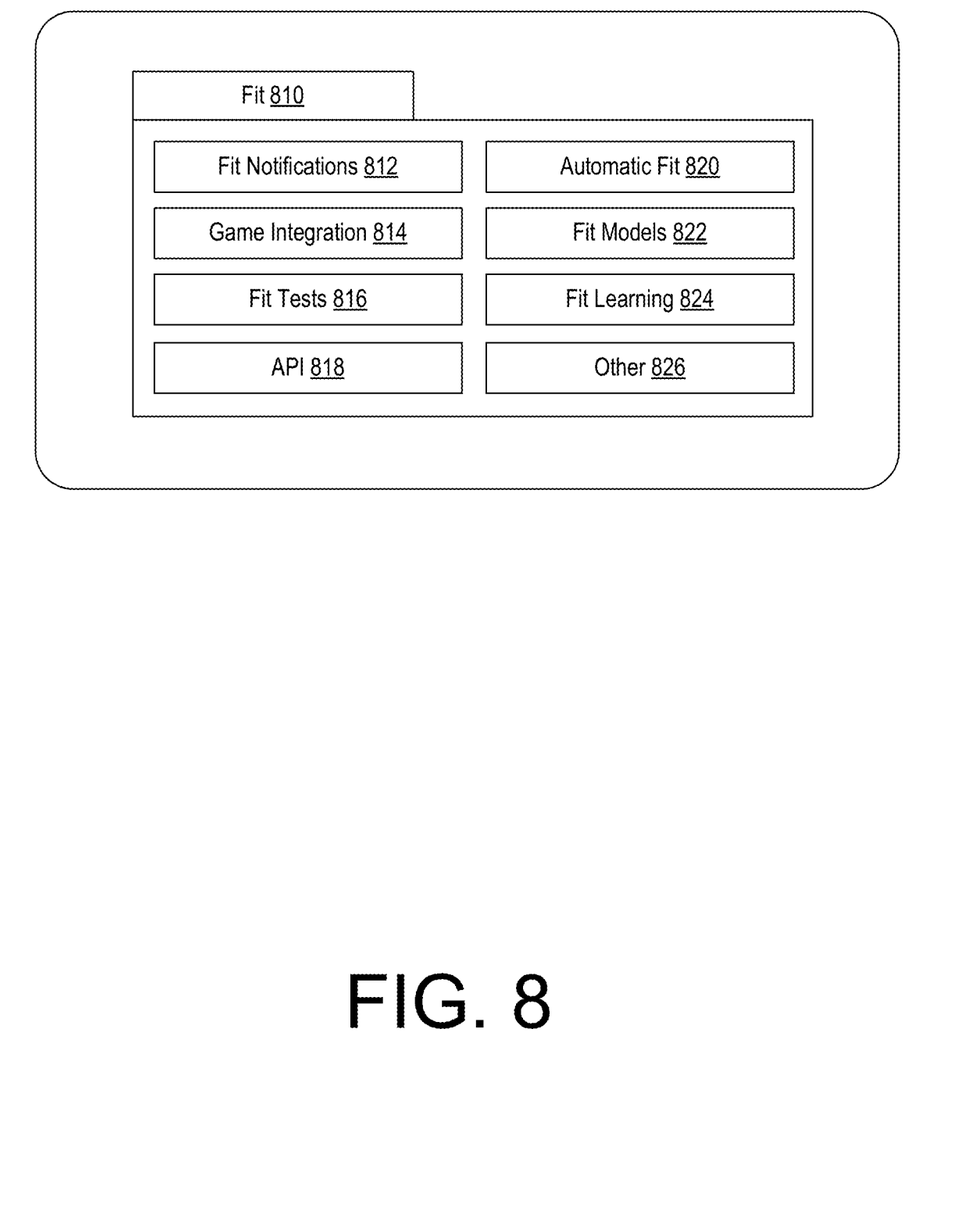
FIG. 8 is a diagram of an example of a graphical user interface.

FIG. 8 shows an example of a graphical user interface (GUI) 810 that may be rendered using a display assembly of a headset such as the headset 200. As shown, various options may exist in such a GUI, including, for example, a fit notification option 812, a game integration option 814, a fit tests option 816, one or more APIs option 818, an automatic fit option 820, a fit models option 822, a fit learning option 824 and one or more other options 826 (e.g., alignment, misalignment, etc.). In such an example, a user may turn on or turn off fit functionality. As to notifications, these may be set to be visual and/or audible and/or haptic where haptic features are available. As to fit tests, these may include up down and/or side to side types of tests that aim to uncover particular types of fit and/or misfit. As to automatic fit, where capabilities are available, such an option may be enabled (e.g., via one or more electric motors, etc.). As to fit models, a model may be provided for a user where one or more parameters can be customized, determined, etc., to help the user improve fit. As to fit learning, as an example, one or more machine learning models may be utilized. For example, consider a ML model that can learn that a user has one ear lower than another and hence that a tilt would exist if the headset did not compensate and, without such compensation, a particular type of profile may be expected as a temple may be above a lower ear and hence have some amount of slop (e.g., slack).

As an example, a headset may acquire and analyze data during a time that does not interfere with executing an application that may be quite demanding. For example, consider a shut down period after gaming where a headset, prior to shutting down, accesses motion data (e.g., position and time data, etc.) to assess fit, which may include processing such data in combination with various location data (e.g., head position, etc.) such that fit and/or fit recommendations may be made, for example, at start-up of a new session. In such an approach, fit related tasks may be performed in a manner that does not interfere with high-demand rendering applications.

Figure 9:
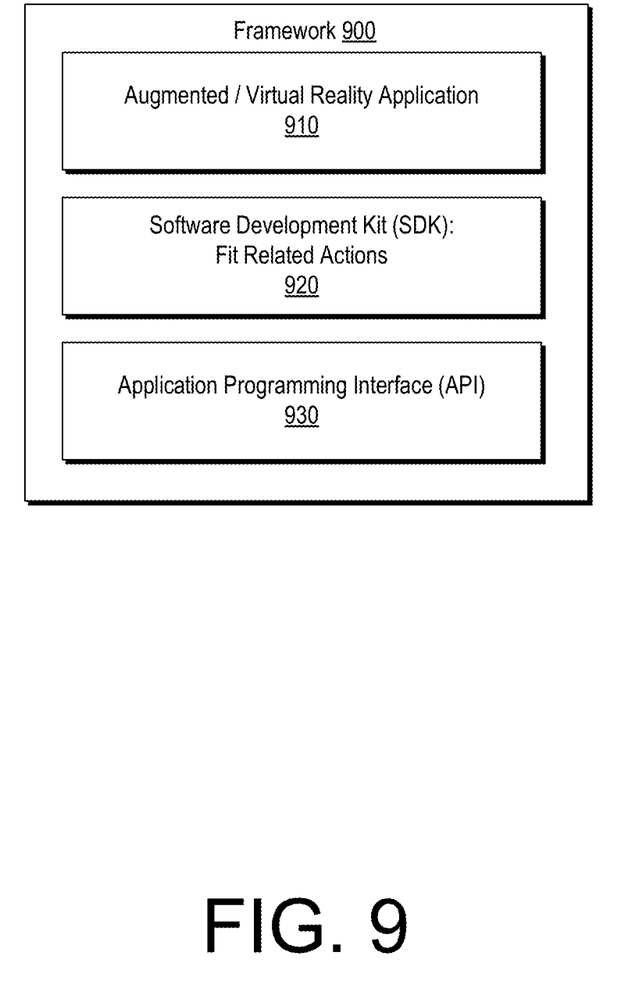
FIG. 9 is a diagram of an example of a framework.

FIG. 9 shows an example of a framework 900 that includes one or more AR/VR applications 910, a SDK 920 for fit related actions, and an API 930 that may operate with one or more of the AR/VR applications 910, the SDK 920, etc., where a user or developer may generate various features involving fit related actions.

Figure 10:
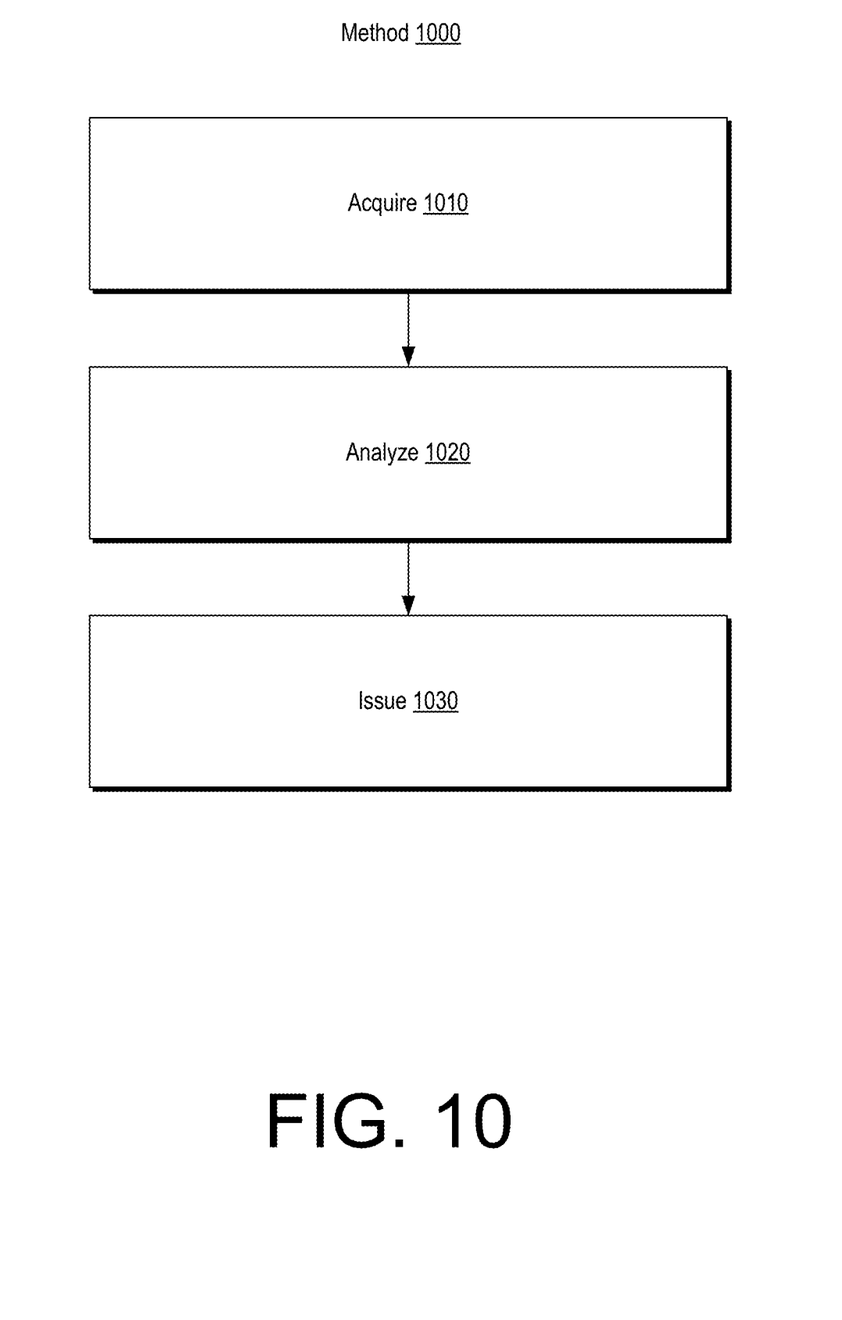
FIG. 10 is a diagram of an example of a method.

FIG. 10 shows an example of a method 1000 that includes an acquisition block 1010 for acquiring motion data via a motion sensor of a headset; an analysis block 1020 for analyzing the motion data to detect a rebound; and an issuance block 1030 for issuing an instruction responsive to detection of the rebound. In such an example, the method may include a render block, for example, for rendering a visualization to a display assembly of the headset during the acquiring motion data.

As explained, proper fit of a headset can improve a user's experience. As explained, in various instances, improper fit may lead to one or more types of alignment issues (see, e.g., FIG. 1, FIG. 3C, etc.). As an example, improper fit may lead to movements that degrade a user's experience, for example, during gaming.

As explained, various types of data may be acquired, which may be multidimensional, for example, in one or more coordinate systems. As to a user's head, one coordinate system may be in a plane through a user's eyes and/or through a user's ears. In such an example, fit may be assessed, particularly for side to side head movements. As an example, a coordinate system may be in a mid-plane that passes along a user's nose (e.g., between the eyes and ears) where fit may be assessed, particularly for up and down head movements. As explained, a spatial 3D coordinate system may be utilized. In various instances, position versus time data may trace paths in 1D, 2D or 3D where various aspects of such data may be utilized to improve fit. In various instances, particular eye glasses types of parameters may be utilized (see, e.g., FIG. 3C) that can help to coordinate fit and vision (e.g., alignment of a display assembly, etc.).

As an example, a headset can include a frame; a display assembly supported by the frame; a motion sensor that generates motion data responsive to motion of the frame; and circuitry that generates a frame fit signal via the motion data. In such an example, the circuitry can be operatively coupled to the display assembly for rendering a visual indicator based on the frame fit signal. For example, consider a visual indicator that can include an instruction for adjusting the frame.

As an example, motion data can include position data with respect to time. In various examples, motion data may be analyzed with respect to speed, acceleration, momentum, force, time, shape, size, orientation, etc., which may provide an indication or indications as to a cause of a looseness of fit (e.g., for manual and/or automatic adjustment of fit).

As an example, a headset can include circuitry that analyzes motion data with respect to a coordinate system. In such an example, the coordinate system can be a multidimensional, spatial coordinate system. As an example, time may be utilized, for example, time stamps and, for example, gaps between data points may be analyzed with respect to time (e.g., for a particular sampling rate for motion data where spatial separation can correspond to time, etc.).

As an example, a headset can include circuitry that analyzes motion data for a rebound.

As an example, a headset can include circuitry that analyzes motion data using a maximum travel position of the frame and a return travel position of the frame. For example, consider a scenario where a time difference between a time of the maximum travel position and a time of the return travel position is less than two seconds.

As an example, a headset can include circuitry that analyzes motion data for a loose frame fit artefact. For example, consider a loose frame fit artefact that degrades visualization of a rendering to a display assembly (e.g., degraded via misalignment, etc.).

As an example, a headset can include circuitry that analyzes motion data for a change in sign of acceleration. For example, consider acceleration being directional and, with a loose fit rebound, the direction can change so acceleration goes through null and changes sign.

As an example, a motion sensor can be or include an inertial sensor.

As an example, a headset can include a test mode that renders an instruction to a display assembly to instruct a wearer of the headset to perform an action (e.g., 2D, 3D, etc.). For example, consider a scenario where a frame fit signal is based on motion data acquired during the performance of the action.

As an example, a headset can include at least one of virtual reality circuitry and augmented reality circuitry.

As an example, a headset can include a frame that includes temples (e.g., that extend from temple region to ears of a user).

As an example, a headset can include a frame that includes a head strap or head straps.

As an example, a method can include acquiring motion data via a motion sensor of a headset; analyzing the motion data to detect a rebound; and issuing an instruction responsive to detection of the rebound. In such an example, the method can include rendering a visualization to a display assembly of the headset during the acquiring motion data.

In various examples, circuitry may optionally rely on one or more computer-readable media that includes computer-executable instructions. As described herein, a computer-readable medium may be a storage device (e.g., a memory card, a storage disk, etc.) and referred to as a computer-readable storage medium that is non-transitory, not a carrier wave and not a signal.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A headset comprising:
   a frame;
   a display assembly supported by the frame;
   a motion sensor that generates motion data responsive to motion of the frame; and
   circuitry that generates a frame fit signal via the motion data, wherein the circuitry analyzes the motion data for a rebound of the frame after a maximum excursion of the frame and analyzes the motion data using a geometric model for the rebound to determine a metric to characterize looseness of fit.

2. The headset of claim 1, wherein the circuitry is operatively coupled to the display assembly for rendering a visual indicator based on the frame fit signal.

3. The headset of claim 2, wherein the visual indicator comprises an instruction for adjusting the frame.

4. The headset of claim 1, wherein the motion data comprise position data with respect to time.

5. The headset of claim 1, wherein the circuitry analyzes the motion data with respect to a coordinate system.

6. The headset of claim 5, wherein the coordinate system is a multidimensional, spatial coordinate system.

7. The headset of claim 1, wherein the circuitry analyzes the motion data using a maximum travel position of the frame as the maximum excursion and a return travel position of the frame.

8. The headset of claim 7, wherein a time difference between a time of the maximum travel position and a time of the return travel position is less than two seconds.

9. The headset of claim 1, wherein the circuitry analyzes the motion data for a loose frame fit artefact.

10. The headset of claim 9, wherein the loose frame fit artefact degrades visualization of a rendering to the display assembly.

11. The headset of claim 1, wherein the circuitry analyzes the motion data for a change in sign of acceleration.

12. The headset of claim 1, wherein the motion sensor comprises an inertial sensor.

13. The headset of claim 1, comprising a test mode that renders an instruction to the display assembly to instruct a wearer of the headset to perform an action.

14. The headset of claim 13, wherein the frame fit signal is based on motion data acquired during the performance of the action.

15. The headset of claim 1, comprising at least one of virtual reality circuitry and augmented reality circuitry.

16. The headset of claim 1, wherein the frame comprises temples.

17. The headset of claim 1, wherein the frame comprises a head strap.

18. A method comprising:
   acquiring motion data via a motion sensor of a headset;
   analyzing, via circuitry, the motion data to detect a rebound of the headset after a maximum excursion of the headset and to determine a metric to characterize looseness of fit using a geometric model for the rebound; and
   issuing an instruction responsive to detection of the rebound.

19. The method of claim 18, comprising rendering a visualization to a display assembly of the headset during the acquiring motion data.

* * * * *